United States Patent
Kamimae et al.

(10) Patent No.: US 9,267,267 B1
(45) Date of Patent: Feb. 23, 2016

(54) WHEEL LOADER

(71) Applicant: KOMATSU LTD., Tokyo (JP)

(72) Inventors: Takeshi Kamimae, Kanazawa (JP); Yutaka Tanaka, Komatsu (JP); Syuhei Takarae, Kanazawa (JP); Shuyu Nagaoka, Komatsu (JP); Hirotaka Kamekura, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/423,510

(22) PCT Filed: Sep. 4, 2014

(86) PCT No.: PCT/JP2014/073327
§ 371 (c)(1),
(2) Date: Feb. 24, 2015

(87) PCT Pub. No.: WO2015/118712
PCT Pub. Date: Aug. 13, 2015

(51) Int. Cl.
*E02F 9/08* (2006.01)
*B60K 13/04* (2006.01)
*B60K 13/02* (2006.01)

(52) U.S. Cl.
CPC .............. *E02F 9/0866* (2013.01); *B60K 13/02* (2013.01); *B60K 13/04* (2013.01); *E02F 9/0883* (2013.01)

(58) Field of Classification Search
CPC ...... E02F 9/0866; E02F 9/0883; B60K 13/04; B60K 13/02; F02M 35/048
See application file for complete search history.

(56) References Cited

U.S. PATENT DOCUMENTS

| | | | |
|---|---|---|---|
| 8,141,535 B2* | 3/2012 | Olsen ................. | F01N 13/1805 123/195 A |
| 9,016,428 B2* | 4/2015 | Numa ................. | F01N 3/2066 180/296 |
| 2010/0192551 A1* | 8/2010 | Yokota ................ | B60K 15/063 60/295 |
| 2012/0247861 A1* | 10/2012 | Mizuno ................ | B60K 13/04 180/296 |
| 2013/0000281 A1* | 1/2013 | Merchant ............. | E02F 3/7609 60/295 |
| 2014/0196974 A1 | 7/2014 | Hayashi et al. | |

(Continued)

FOREIGN PATENT DOCUMENTS

| | | |
|---|---|---|
| CN | 202132281 U | 2/2012 |
| CN | 103906878 A | 7/2014 |

(Continued)

OTHER PUBLICATIONS

The International Search Report for the corresponding international patent application No. PCT/JP2014/073327, issued on Dec. 9, 2014.

(Continued)

*Primary Examiner* — John Walters
*Assistant Examiner* — Brian Swenson
(74) *Attorney, Agent, or Firm* — Global IP Counselors, LLP

(57) ABSTRACT

An engine room is disposed rearward of a cab. An engine is disposed inside the engine room. A first exhaust processing device and a second exhaust processing device are disposed over the engine. An air cleaner is disposed in the engine room in front of the first exhaust processing device and the second exhaust processing device. A tank is disposed between the cab and the air cleaner in the vehicle front-back direction. A rear surface of the tank has a lower rear surface part and an upper rear surface part. The upper rear surface part is disposed above the lower rear surface part and is positioned forward of the lower rear surface part. At least a portion of the air cleaner is disposed facing the upper rear surface part.

18 Claims, 5 Drawing Sheets

(56) References Cited

U.S. PATENT DOCUMENTS

| | | | |
|---|---|---|---|
| 2015/0016932 A1* | 1/2015 | Azuma | E02F 9/0833 414/687 |
| 2015/0114363 A1* | 4/2015 | Voss | B60K 15/077 123/541 |
| 2015/0136503 A1* | 5/2015 | Yokota | F02M 35/084 180/68.3 |
| 2015/0233089 A1* | 8/2015 | Kamimae | E02F 9/0866 180/309 |
| 2015/0299981 A1 | 10/2015 | Hayashi et al. | |

FOREIGN PATENT DOCUMENTS

| | | |
|---|---|---|
| JP | 2012-136845 A | 7/2012 |
| JP | 5205551 B2 | 6/2013 |
| JP | 5507769 B1 | 5/2014 |
| JP | 5526288 B1 | 6/2014 |

OTHER PUBLICATIONS

The Office Action for the corresponding Chinese application No. 201480002148.7, issued on Oct. 9, 2015.

* cited by examiner

WHEEL LOADER

CROSS-REFERENCE TO RELATED APPLICATIONS

This application is a U.S. National stage application of International Application No. PCT/JP2014/073327, filed on Sep. 4, 2014.

BACKGROUND

Field of the Invention

The present invention relates to a wheel loader.

Background Information A conventionally-known wheel loader has mounted thereon an exhaust processing device for purifying exhaust gas from an engine. For example, the wheel loader in Japanese Patent Laid-open No. 2012-136845 is provided with a cab and an engine room disposed rearward of the cab. The engine is disposed inside the engine room and the exhaust processing device is disposed above the engine. An air cleaner is disposed at the side of the exhaust processing device.

Recently, exhaust gas restrictions have become stricter and two or more exhaust processing devices are mounted on work vehicles, such as hydraulic excavators. These exhaust processing devices include, for example, a diesel particulate filter (DPF) device and a selective catalyst reduction (SCR) device. The diesel particulate filter device collects and removes particulate matter, such as soot and the like, included in the diesel engine exhaust. The selective catalytic reduction device reduces nitrogen oxides (NOx) in the exhaust.

SUMMARY

The width of the engine room in a wheel loader is restricted by the distance between the left and right tires. As a result, it would be difficult to dispose two or more exhaust processing devices and dispose the air cleaner at the side thereof in the wheel loader described in Japanese Patent Laid-open No. 2012-136845.

Moreover, when the air cleaner is disposed in a row in the vehicle front-back direction with the two or more exhaust processing devices, the engine room becomes very large in the front-back direction. Because the engine room is disposed rearward of the cab, the problem of a reduction in visibility to the rear from the cab arises when the engine room size is increased in the front-back direction.

An object of the present invention is to suppress a reduction in visibility to the rear in a wheel loader in which two or more exhaust processing devices are disposed in the engine room.

A wheel loader according to a first aspect of the present invention includes a cab, an engine room, and an engine, a first exhaust processing device, a second exhaust processing device, an air cleaner, and a tank. The engine room is disposed rearward of the cab. The engine is disposed inside the engine room. The first exhaust processing device and the second exhaust processing device are disposed above the engine. The air cleaner is disposed in the engine room in front of the first exhaust processing device and the second exhaust processing device. The tank is disposed between the cab and the air cleaner in the vehicle front-back direction. The rear surface of the tank has a lower rear surface part and an upper rear surface part. The upper rear surface part is disposed above the lower rear surface part and is positioned forward the lower rear surface part. At least a portion of the air cleaner is disposed facing the upper rear surface part.

The upper rear surface part is positioned forward of the lower rear surface part in the wheel loader according to an exemplary embodiment. Therefore, the air cleaner, the tank, the first exhaust processing device, and the second exhaust processing device can be disposed in a compact manner in the vehicle front-back direction by disposing the air cleaner nearer the upper rear surface part of the tank. As a result, an increase in the size of the engine room in the vehicle front-back direction can be suppressed. Consequently, a reduction in visibility to the rear is suppressed in the wheel loader in which two or more exhaust processing devices are disposed in the engine room.

At least a portion of the air cleaner preferably overlaps the lower rear surface part as seen in a plan view. In this case, the tank, the air cleaner, the first exhaust processing device, and the second exhaust processing device can be disposed in a compact manner in the vehicle front-back direction.

The first exhaust processing device, the second exhaust processing device, and the air cleaner are preferably disposed above the lower rear surface part. In this case, any adverse effect on the installation space for the first exhaust processing device, the second exhaust processing device, and the air cleaner is reduced even when the capacity of the lower part of the tank is increased. Consequently, the tank, the air cleaner, the first exhaust processing device, and the second exhaust processing device can be disposed in a compact manner in the vehicle front-back direction even while increasing the capacity of the tank.

The rear surface of the tank preferably further has an inclined surface part. The inclined surface part is disposed between the lower rear surface part and the upper rear surface part in the up-down direction and is inclined forward and upward. Air included in the storage contents inside the tank easily rises upward along the inclined surface. As a result, the generation of aeration inside the tank can be suppressed.

At least a portion of the air cleaner preferably overlaps the inclined surface part as seen in a plan view. The tank, the air cleaner, the first exhaust processing device, and the second exhaust processing device can be disposed in a compact manner in the vehicle front-back direction.

The dimension in the up-down direction of the lower rear surface part is preferably less than the dimension in the up-down direction of the inclined surface part. The air cleaner can be disposed lower. As a result, an increase in the height of the position of the upper surface of the engine room can be suppressed. Consequently, a reduction in visibility to the rear can be suppressed.

The dimension in the up-down direction of the inclined surface part is preferably greater than the dimension in the front-back direction of the inclined surface part. The inclination angle with respect to the up-down direction of the inclined surface part can be reduced. As a result, the generation of aeration inside the tank can be more effectively suppressed.

The rear surface of the tank preferably has a bent portion positioned between the upper rear surface part and the inclined surface part. The air cleaner is disposed facing the bent portion. The tank, the air cleaner, the first exhaust processing device, and the second exhaust processing device can be disposed in a compact manner in the vehicle front-back direction.

The upper surface of the tank preferably is higher than the upper surface of the air cleaner. An increase in the capacity of the tank can be assured.

The upper rear surface part is preferably formed from a flat surface that extends in the up-down and left-right direction. An increase in the capacity of the tank can be assured.

At least a portion of the air cleaner preferably overlaps the engine as seen in a top view. The air cleaner, the first exhaust processing device, and the second exhaust processing device can be disposed in a compact manner in the vehicle front-back direction.

The angle in the up-down direction of the inclined surface part is preferably in a range of greater than or equal to 10 degrees and less than or equal to 20 degrees. The generation of aeration inside the tank can be more effectively suppressed.

The first exhaust processing device is preferably disposed so that the center axis extends in the vehicle width direction. The second exhaust processing device is disposed in front of the first exhaust processing device and is disposed so that the center axis extends in the vehicle width direction. The air cleaner, the first exhaust processing device, and the second exhaust processing device can be disposed in a compact manner in the vehicle front-back direction. Consequently, a reduction in visibility to the rear can be suppressed.

The air cleaner is preferably disposed so that the center axis of the air cleaner extends in the vehicle width direction. The air cleaner, the first exhaust processing device, and the second exhaust processing device can be disposed in a compact manner in the vehicle front-back direction.

The wheel loader preferably further includes an exhaust pipe and an intake pipe. The exhaust pipe is connected to the second exhaust processing device. The intake pipe is connected to the air cleaner. The intake pipe is disposed forward the exhaust pipe. The suction of exhaust into the air cleaner can be more effectively suppressed.

The exhaust pipe is preferably positioned over the second exhaust processing device. The intake pipe is positioned over the air cleaner. The lengths of the exhaust pipe and the intake pipe can be reduced.

The wheel loader preferably further includes a partition wall and a cooling device. The partition wall is disposed rearward of the engine. The cooling device has a radiator and a fan. The cooling device is disposed rearward of the partition wall. The air cleaner, the first exhaust processing device, and the second exhaust processing device can be disposed in a compact manner between the cooling device and the cab.

The wheel loader preferably further includes a connecting pipe. The connecting pipe is disposed over the first exhaust processing device and/or the second exhaust processing device and connects the first exhaust processing device and the second exhaust processing device. The first exhaust processing device and the second exhaust processing device can be disposed near each other in the vehicle front-back direction. As a result, the size of the engine room can be made smaller in the vehicle front-back direction.

The wheel loader preferably further includes a partitioning member. The partitioning member is disposed between the second exhaust processing device and the air cleaner. Even though the second exhaust processing device and the air cleaner are disposed near each other, the adverse effect of heat from the second exhaust processing device on the air cleaner can be suppressed.

According to the exemplary embodiments of the present invention, a reduction in visibility to the rear is suppressed in the wheel loader in which two or more exhaust processing devices are disposed in the engine room.

DETAILED DESCRIPTION OF EXEMPLARY EMBODIMENTS

Figure 1:
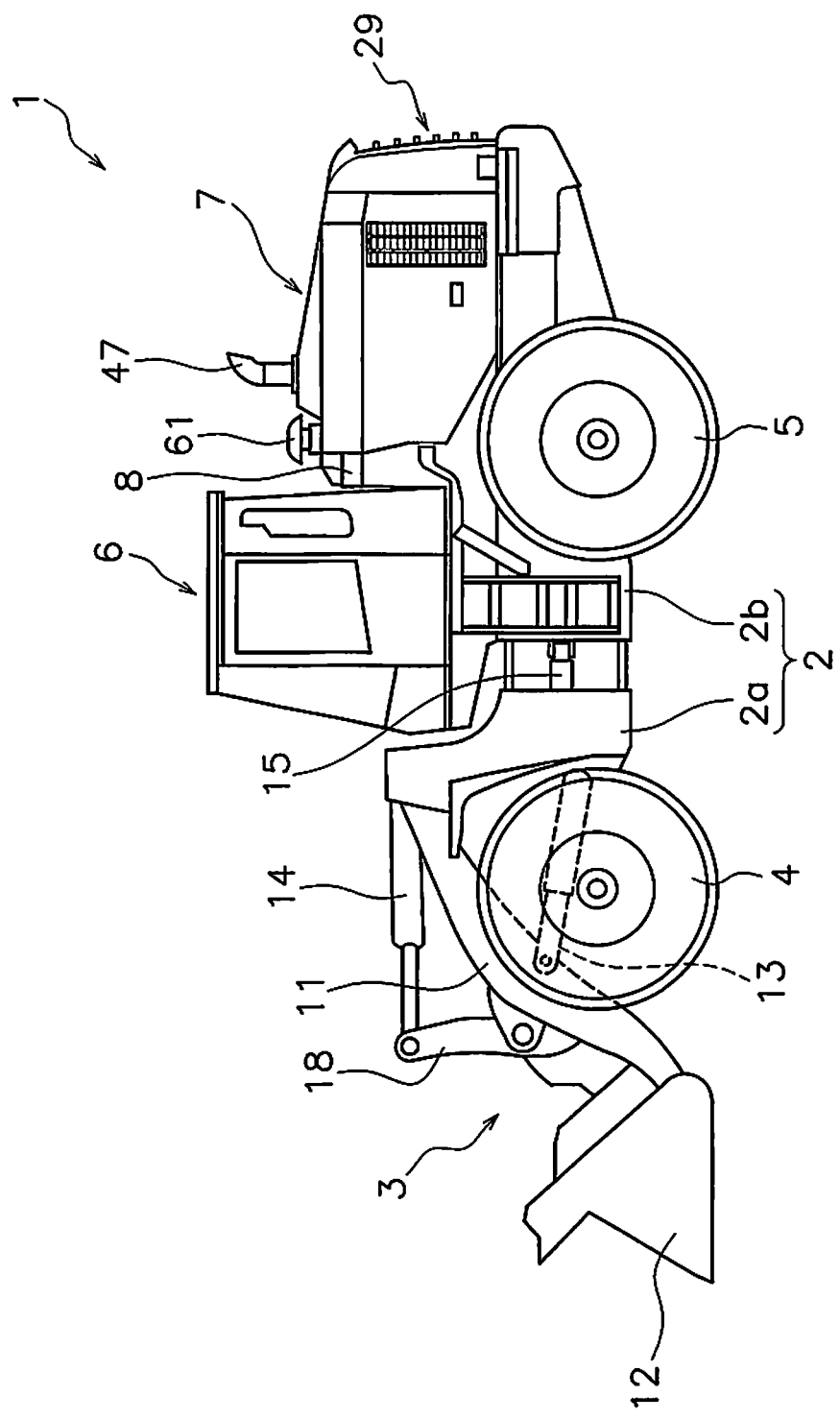
FIG. 1 is a side view of a wheel loader according to an exemplary embodiment.

A wheel loader 1 according to an exemplary embodiment will be explained below with reference to the drawings. FIG. 1 is a side view of a wheel loader 1 according to the exemplary embodiment. The wheel loader 1 includes a vehicle body frame 2, a work implement 3, traveling wheels 4 and 5, and a cab 6 as illustrated in FIG. 1. The wheel loader 1 travels due to the traveling wheels 4 and 5 being driven in a rotating manner. The wheel loader 1 is able to carry out work, such as excavation, by using the work implement 3.

The work implement 3 is attached to the vehicle body frame 2. The work implement 3 is driven by hydraulic fluid from a work implement pump, which is not illustrated. The work implement 3 has a boom 11 and a bucket 12. The boom 11 is mounted on the vehicle body frame 2. The work implement 3 has a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the hydraulic pump. The bucket 12 is attached to the tip of the boom 11. One end of the bucket cylinder 14 is attached to the vehicle body frame 2. The other end of the bucket cylinder 14 is attached to a tilt arm 18. The bucket cylinder 14 drives the bucket 12 via the tilt arm 18 and a tilt rod, which is not illustrated. The bucket 12 swings up and down due to the extension and contraction of the bucket cylinder 14 due to hydraulic fluid from the hydraulic pump.

The cab 6 and the traveling wheels 4 and 5 are attached to the vehicle body frame 2. The cab 6 is disposed on the vehicle body frame 2. A seat for the operator to sit and a below-mentioned operating device are disposed in the cab 6. The vehicle body frame 2 has a front frame 2a and a rear frame 2b. The front frame 2a and the rear frame 2b are attached to each other in a manner that allows swinging in the left-right direction. In the exemplary embodiment, front, rear, left, and right refer to the front, rear, left, and right directions as seen from an operator inside the cab 6.

The work implement 3 is attached to the front frame 2a. The cab 6 is disposed on the rear frame 2b. An engine room 7 is disposed on the rear frame 2b. The engine room 7 is disposed rearward of the cab 6. A hydraulic fluid tank 8 is disposed between the engine room 7 and the cab 6 in the vehicle front-back direction. The hydraulic fluid tank 8 is explained in detail below.

The wheel loader 1 has a steering cylinder 15. The steering cylinder 15 is attached to the front frame 2a and the rear frame 2b. The steering cylinder 15 is a hydraulic cylinder. The wheel loader 1 is able to change the traveling direction to the right or left with the extension and contraction of the steering cylinder 15 due to hydraulic fluid from the hydraulic pump.

Figure 2:
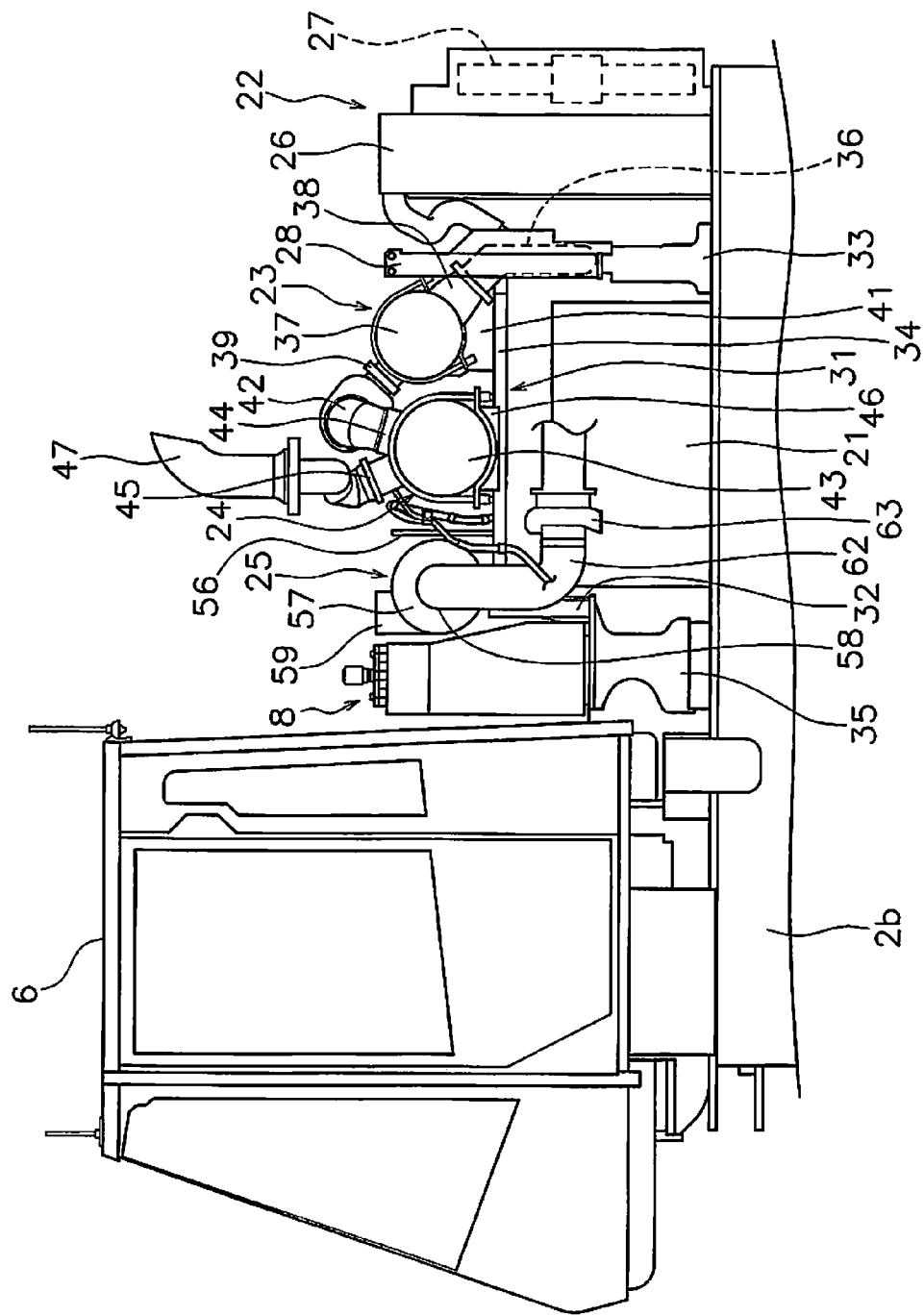
FIG. 2 is a side view depicting a configuration of the inside of an engine room.
Figure 3:
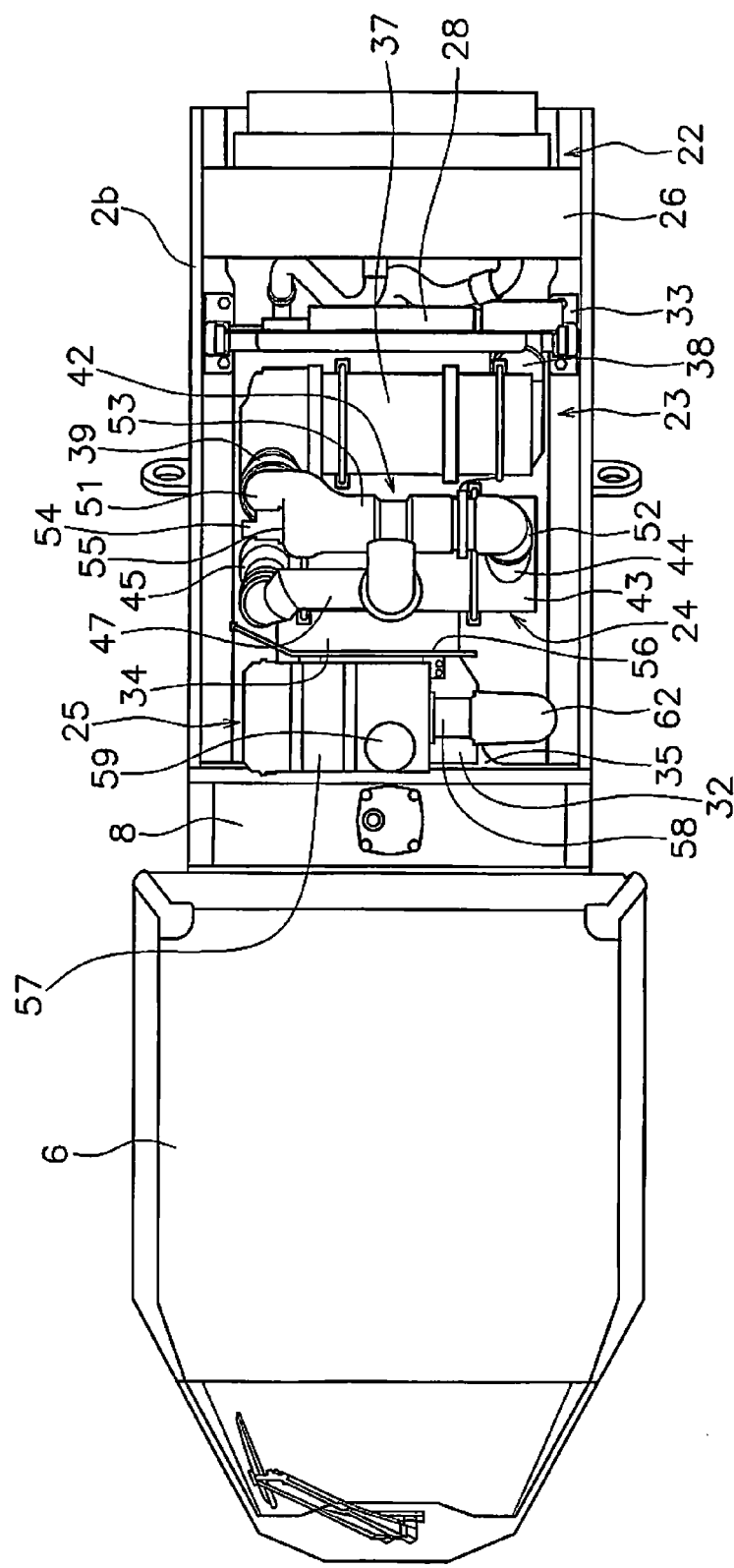
FIG. 3 is a plan view depicting a configuration inside the engine room.

FIG. 2 is a side view of a configuration of the inside of the engine room 7. FIG. 3 is a plan view of a configuration of the inside of the engine room 7. As illustrated in FIGS. 2 and 3, an engine 21, a cooling device 22, a first exhaust processing device 23, a second exhaust processing device 24, and an air cleaner 25 are disposed inside the engine room 7.

The engine 21 drives the abovementioned traveling wheels 4 and 5 and the hydraulic pump. The engine 21 is supported by the rear frame 2b. The cooling device 22 has a radiator 26 and a fan 27. The radiator 26 cools cooling liquid for the engine 21. The fan 27 generates an air flow that flows through the radiator 26 toward the rear of the radiator 26. A partition wall 28 is disposed between the cooling device 22 and the engine 21. The partition wall 28 is disposed rearward of the engine 21. The cooling device 22 is disposed rearward of the partition wall 28. As illustrated in FIG. 1, a discharge port 29 is provided on the rear surface of the engine room 7. Air that passes through the radiator 26 is discharged to the rear from the discharge port 29 in the rear surface of the engine room 7.

As illustrated in FIG. 2, a supporting frame 31 is disposed on the rear frame 2b. The supporting frame 31 supports the first exhaust processing device 23 and the second exhaust processing device 24. Specifically, the supporting frame 31 has a front leg part 32, a rear leg part 33, and a base part 34. The front leg part 32 and the rear leg part 33 support the base part 34.

The rear leg part 33 is disposed rearward of the engine 21. The rear leg part 33 is disposed standing on the rear frame 2b. The above-mentioned partition wall 28 is attached to the rear leg part 33. The front leg part 32 is disposed on a tank supporting part 35. The tank supporting part 35 is disposed on the rear frame 2b. The tank supporting part 35 is disposed under the hydraulic fluid tank 8 and supports the hydraulic fluid tank 8. The base part 34 is disposed over the engine 21. The base part 34 is a plate-like member. The first exhaust processing device 23 and the second exhaust processing device 24 are disposed on the base part 34.

The first exhaust processing device 23 is disposed over the engine 21. The first exhaust processing device 23 is, for example, a diesel particulate filter (DPF). The first exhaust processing device 23 is disposed so that the center axis of the first exhaust processing device 23 extends in the vehicle width direction. The first exhaust processing device 23 is disposed so that the longitudinal direction of the first exhaust processing device 23 extends in the vehicle width direction. The first exhaust processing device 23 is connected to the engine 21 via a first connecting pipe 36.

The first exhaust processing device 23 has a first main pipe part 37, a first connecting port 38, and a second connecting port 39. The first main pipe part 37 has a substantially cylindrical shape. The first main pipe part 37 is attached to the base part 34 via a first bracket 41.

The first connecting port 38 is connected to one end part of the first main pipe part 37 in the vehicle width direction. The second connecting port 39 is connected to the other end part of the first main pipe part 37 in the vehicle width direction. In the exemplary embodiment, the first connecting port 38 is connected to the left end part of the first main pipe part 37. The second connecting port 39 is connected to the right end part of the first main pipe part 37. However, the first connecting port 38 may be connected to the right end part of the first main pipe part 37. The second connecting port 39 may be connected to the left end part of the first main pipe part 37.

The first connecting port 38 protrudes from the first main pipe part 37 in a manner that is inclined toward the rear and downward. The first connecting pipe 36 is connected to the first connecting port 38. The second connecting port 39 protrudes from the first main pipe part 37 in a manner that is inclined toward the front and upward. A below-mentioned second connecting pipe 42 is connected to the second connecting port 39.

The second exhaust processing device 24 is disposed in front of the first exhaust processing device 23 over the engine 21. The second exhaust processing device 24 is, for example, a selective catalytic reducer (SCR). The second exhaust processing device 24 is disposed so that the center axis of the second exhaust processing device 24 extends in the vehicle width direction. The second exhaust processing device 24 is disposed so that the longitudinal direction of the second exhaust processing device 24 extends in the vehicle width direction. The second exhaust processing device 24 is connected to the first exhaust processing device 23 via the second connecting pipe 42.

The second exhaust processing device 24 has a second main pipe part 43, a third connecting port 44, and a fourth connecting port 45. The second main pipe part 43 has a substantially cylindrical shape. The second main pipe part 43 is attached to the base part 34 via a second bracket 46. The uppermost part of the second main pipe part 43 is positioned below the uppermost part of the first main pipe part 37. The bottom part of the second main pipe part 43 is positioned below the bottom part of the first main pipe part 37.

The third connecting port 44 is connected to one end part of the second main pipe part 43 in the vehicle width direction. The fourth connecting port 45 is connected to the other end part of the second main pipe part 43 in the vehicle width direction. In the exemplary embodiment, the third connecting port 44 is connected to the left end part of the second main pipe part 43 in the vehicle width direction. The fourth connecting port 45 is connected to the right end part of the second main pipe part 43 in the vehicle width direction. However, the third connecting port 44 may be connected to the right end part of the second main pipe part 43 in the vehicle width direction. The fourth connecting port 45 may be connected to the left end part of the second main pipe part 43 in the vehicle width direction.

The third connecting port 44 protrudes from the second main pipe part 43 in a manner that is inclined toward the rear and upward. The second connecting pipe 42 is connected to the third connecting port 44. The fourth connecting port 45 protrudes from the second main pipe part 43 in a manner that is inclined toward the front and upward. An exhaust pipe 47 is connected to the fourth connecting port 45.

The first exhaust processing device 23 and the second exhaust processing device 24 are connected to each other by the second connecting pipe 42. The second connecting pipe 42 is disposed over the second exhaust processing device 24. At least a portion of the second connecting pipe 42 overlaps, or overlies, the second exhaust processing device 24 as seen in a plan view as illustrated in FIG. 3. At least a portion of the second connecting pipe 42 is positioned below the uppermost part of the first exhaust processing device 23, as illustrated in FIG. 2.

As illustrated in FIG. 3, the second connecting pipe 42 has a first connecting end part 51, a second connecting end part 52, and a middle pipe part 53. The first connecting end part 51 is connected to the second connecting port 39 of the first exhaust processing device 23. The second connecting end part 52 is connected to the third connecting port 44 of the second exhaust processing device 24. The middle pipe part 53 is positioned between the first connecting end part 51 and the second connecting end part 52. The middle pipe part 53 of the second connecting pipe 42 extends in the vehicle width direction.

A reducing agent injection device 54 is attached to the second connecting pipe 42. The reducing agent injection device 54 injects a reducing agent, such as a urea water solution, into the second connecting pipe 42. Specifically, the second connecting pipe 42 includes a recessed part 55. The recessed part 55 is positioned between the first connecting end part 51 and the middle pipe part 53. The reducing agent injection device 54 is attached to the recessed part 55.

The exhaust pipe 47 is positioned over the second exhaust processing device 24. The exhaust pipe 47 extends in the vehicle width direction over the second exhaust processing device 24 and bends upward. As illustrated in FIG. 1, the distal end part of the exhaust pipe 47 protrudes upward from the upper surface of the engine room 7. The distal end part of the exhaust pipe 47 is bent toward the rear.

The air cleaner 25 is disposed in front of the second exhaust processing device 24 inside the engine room 7. At least a portion of the air cleaner 25 overlaps, or overlies, the engine 21 as seen in a top plan view. Specifically, the rear part of the air cleaner 25 overlaps the engine 21 as seen in a top plan view. The front part of the air cleaner 25 is positioned forward of the engine 21 and does not overlap the engine 21 as seen in a top plan view. The air cleaner 25 is disposed rearward of the hydraulic fluid tank 8. The air cleaner 25 is disposed over the base part 34. The air cleaner 25 is supported on the exterior cover of the engine room 7 via a supporting member, which is not illustrated.

The air cleaner 25 is disposed so that the center axis of the air cleaner 25 extends in the vehicle width direction. The air cleaner 25 is disposed so that the longitudinal direction of the air cleaner 25 extends in the vehicle width direction. A partitioning member 56 is disposed between the second exhaust processing device 24 and the air cleaner 25. The partitioning member 56 extends in the up-down direction.

The first exhaust processing device 23, the second exhaust processing device 24, and the middle pipe part 53 are not necessarily disposed parallel to each other. The center axes of the first exhaust processing device 23, the second exhaust processing device 24, and the middle pipe part 53 do not necessarily extend in the vehicle width direction. For example, each of the center axes may extend in the front-back direction. Alternatively, each of the center axes may be inclined with respect to the vehicle width direction.

The center axis of the middle pipe part 53 may not be positioned above the respective center axes of the first exhaust processing device 23 and the second exhaust processing device 24. For example, the center axes of the first exhaust processing device 23, the second exhaust processing device 24, and the middle pipe part 53 may be disposed in a row in the horizontal direction.

The air cleaner 25 has a body section 57, a first connecting part 58, and a second connecting part 59. The body section 57 has a substantially cylindrical shape. The first connecting part 58 is connected to one side surface of the body section 57. The first connecting part 58 protrudes from the side surface of the body section 57 in the vehicle width direction. The second connecting part 59 is connected to an upper part of the body section 57. The second connecting part 59 protrudes upward from the body section 57.

An intake pipe 61 illustrated in FIG. 1 is connected to the air cleaner 25. Specifically the intake pipe 61 is connected to the second connecting part 59. The intake pipe 61 is positioned over the air cleaner 25. The intake pipe 61 extends upward from the air cleaner 25 and protrudes upward from the upper surface of the engine room 7. The intake pipe 61 is disposed forward the exhaust pipe 47.

An intake connecting pipe 62 is connected to the air cleaner 25. Specifically, the intake connecting pipe 62 is connected to the first connecting part 58. The intake connecting pipe 62 extends downward from the second connecting part 59 and extends to the rear below the base part 34. The intake connecting pipe 62 is connected to an intake port (not illustrated) of the engine 21 via a supercharger 63.

Figure 4:
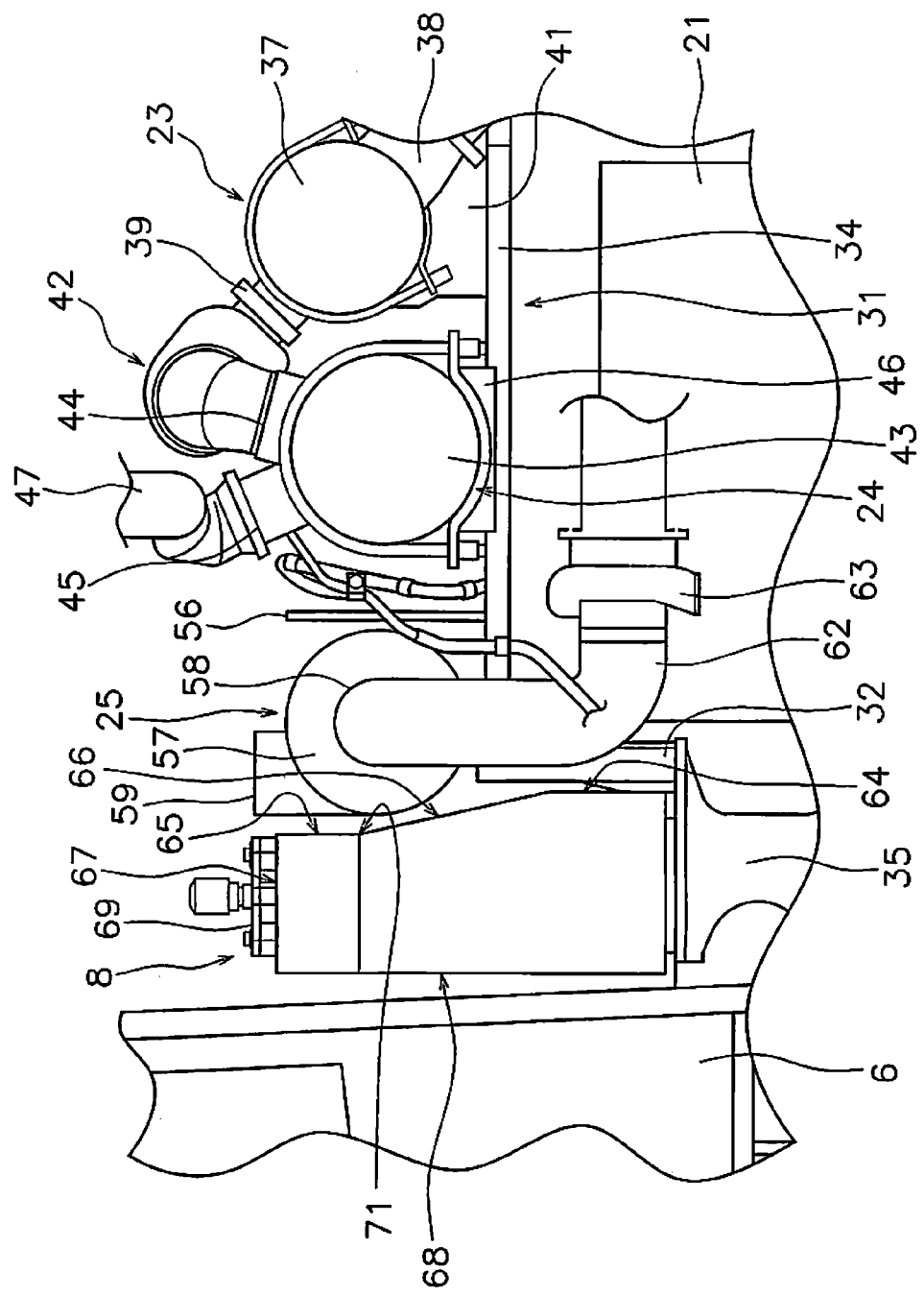
FIG. 4 is an enlarged side view depicting a configuration of an air cleaner and the vicinity thereof.
Figure 5:
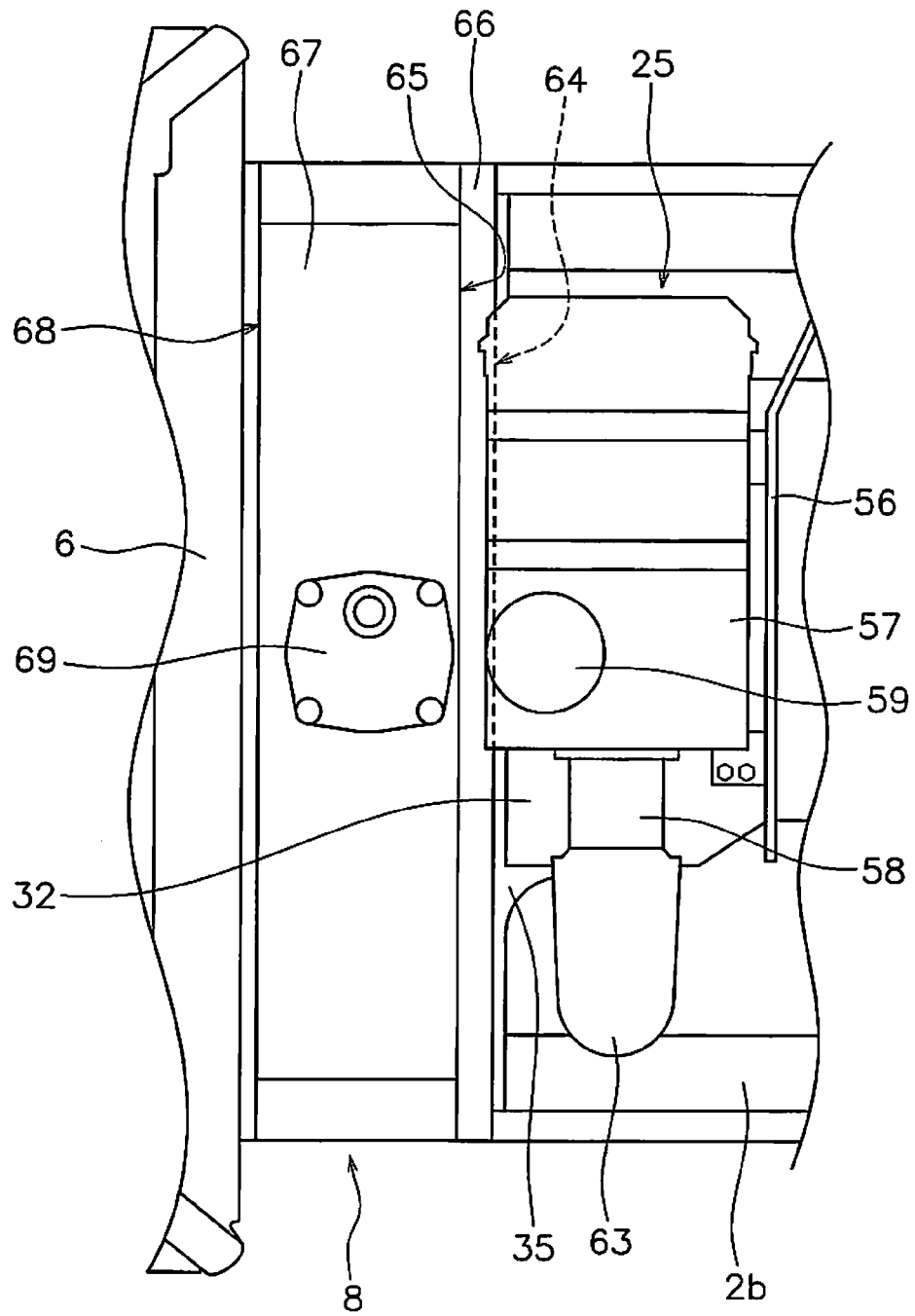
FIG. 5 is an enlarged plan view depicting a configuration of the air cleaner and the vicinity thereof.

The above-mentioned hydraulic fluid tank 8 is disposed in front of the air cleaner 25. The hydraulic fluid tank 8 is disposed between the cab 6 and the air cleaner 25 in the vehicle front-back direction. FIG. 4 is an enlarged side view depicting a configuration of the air cleaner 25 and the vicinity thereof. FIG. 5 is an enlarged top view depicting a configuration of the air cleaner 25 and the vicinity thereof.

As illustrated in FIGS. 4 and 5, the rear surface of the hydraulic fluid tank 8 has a lower rear surface part 64, an upper rear surface part 65, and an inclined surface part 66. The lower rear surface part 64 extends in the up-down direction. The lower rear surface part 64 is formed by a flat surface that extends in the up-down and left-right directions. The lower rear surface part 64 is positioned below the base part 34. The lower rear surface part 64 is positioned in front of the front leg part 32. The upper rear surface part 65 is positioned above the lower rear surface part 64. The upper rear surface part 65 is positioned above the base part 34. The upper rear surface part 65 is positioned forward of the lower rear surface part 64. The upper rear surface part 65 extends in the up-down direction. The upper rear surface part 65 is formed by a flat surface that extends in the up-down and left-right directions. The rear surface of the hydraulic fluid tank 8 has a bent portion 71. The bent portion 71 is positioned between the upper rear surface part 65 and the inclined surface part 66.

The inclined surface part 66 is positioned between the lower rear surface part 64 and the upper rear surface part 65 in the up-down direction. The inclined surface part 66 connects the lower rear surface part 64 and the upper rear surface part 65. The inclined surface part 66 is inclined upward and toward the front. The dimension in the up-down direction of the lower rear surface part 64 is less than the dimension in the up-down direction of the inclined surface part 66. The dimension in the up-down direction of the upper rear surface part 65 is less than the dimension in the up-down direction of the inclined surface part 66. The dimension in the up-down direction of the upper rear surface part 65 is less than the dimension in the up-down direction of the lower rear surface part 64. The dimension in the up-down direction of the inclined surface part 66 is greater than the dimension in the front-back direction of the inclined surface part 66.

At least a portion of the air cleaner 25 is disposed facing the upper rear surface part 65. The first exhaust processing device 23, the second exhaust processing device 24, and the air cleaner 25 are disposed above the lower rear surface part 64. Specifically, the body section 57 faces the upper rear surface part 65 and the inclined surface part 66. The body section 57 is disposed facing the bent portion 71. The uppermost part of the body section 57 is positioned below the upper edge of the upper rear surface part 65. That is, the uppermost part of the body section 57 is positioned below an upper surface 67 of the hydraulic fluid tank 8. A bottom part of the body section 57 is positioned below the lower edge of the upper rear surface part 65. The bottom part of the body section 57 is positioned above the lower edge of the inclined surface part 66.

At least a portion of the body section 57 overlaps the lower rear surface part 64 as seen in a plan view. At least a portion of the body section 57 overlaps the inclined surface part 66 as seen in a plan view. The body section 57 is positioned rearward of the upper rear surface part 65.

The upper surface 67 of the hydraulic fluid tank 8 extends in the front-back direction. A lid member 69 is attached to the upper surface 67 of the hydraulic fluid tank 8. The upper surface 67 of the hydraulic fluid tank 8 is higher than the upper surface of the air cleaner 25. Specifically, the upper surface 67 of the hydraulic fluid tank 8 is higher than the uppermost part of the body section 57 of the air cleaner 25. A front surface 68 of the hydraulic fluid tank 8 extends in the up-down direction. The front surface 68 of the hydraulic fluid tank 8 faces the rear surface of the cab 6. The distance between the front surface 68 and the lower rear surface part 64 of the hydraulic fluid tank 8 is greater than the distance between the front surface 68 and the upper rear surface part 65 of the hydraulic fluid tank 8. That is, the dimension in the front-back direction of the lower part of the hydraulic fluid tank 8 including the lower rear surface part 64 is greater than the dimension in the front-back direction of the upper part of the hydraulic fluid tank 8 including the upper rear surface part 65.

Air is introduced from the intake pipe 61 into the air cleaner 25, passes through the intake connecting pipe 62 and the supercharger 63, and is supplied to the engine 21 in the wheel loader 1 according to the exemplary embodiment. Exhaust from the engine 21 is introduced into the first exhaust processing device 23 via the first connecting pipe 36.

The first exhaust processing device 23 collects particulate matter, such as soot and the like, in the exhaust. A reducing agent, such as a urea water solution. is then injected into the exhaust so that the exhaust and the reducing agent are mixed inside the second connecting pipe 42. The nitrogen oxides in the exhaust are purified by reduction in the second exhaust processing device 24.

At least a portion of the air cleaner 25 is disposed facing the upper rear surface part 65 in the wheel loader 1 according to the exemplary embodiment as described above. At least a portion of the air cleaner 25 overlaps the lower rear surface part 64 as seen in a plan view. At least a portion of the air cleaner 25 overlaps the inclined surface part 66 as seen in a plan view. As a result, the air cleaner 25, the first exhaust processing device 23, and the second exhaust processing device 24 can be disposed in a compact manner in the vehicle front-back direction. Consequently, a reduction in visibility to the rear can be suppressed.

The first exhaust processing device 23, the second exhaust processing device 24, and the air cleaner 25 are disposed above the lower rear surface part 64. As a result, the hydraulic fluid tank 8, the air cleaner 25, the first exhaust processing device 23, and the second exhaust processing device 24 can be disposed in a compact manner in the vehicle front-back direction. An increase in the capacity of the hydraulic fluid tank 8 can be assured by disposing the lower rear surface part 64 as much as possible to the rear.

The rear surface of the hydraulic fluid tank 8 has the inclined surface part 66. Air contained in the storage contents inside the hydraulic fluid tank 8 easily rises upward along the inclined surface part 66. As a result, the generation of aeration can be suppressed. To suppress the generation of aeration, the angle of the inclined surface part 66 with respect to the up-down direction is preferably as small as possible. The angle of the inclined surface part 66 with respect to the up-down direction is preferably in a range of greater than or equal to 10 degrees and less than or equal to 20 degrees.

The dimension in the up-down direction of the lower rear surface part 64 is less than the dimension in the up-down direction of the inclined surface part 66. As a result, the air cleaner 25 can be disposed lower. As a result, an increase in the height of the position of the upper surface of the engine room 7 can be suppressed. Consequently, a reduction in visibility to the rear can be suppressed.

The air cleaner 25 is disposed so that the center axis of the air cleaner 25 extends in the vehicle width direction. As a result, the air cleaner 25, the first exhaust processing device 23, and the second exhaust processing device 24 can be disposed in a compact manner in the vehicle front-back direction.

The intake pipe 61 is disposed forward of the exhaust pipe 47. As a result, the suction of exhaust into the air cleaner 25 can be more effectively suppressed.

The exhaust pipe 47 is positioned over the second exhaust processing device 24. The intake pipe 61 is positioned over the air cleaner 25. As a result, the lengths of the exhaust pipe 47 and the intake pipe 61 can be reduced.

The partition wall 28 is disposed rearward of the engine 21. The cooling device 22 is disposed rearward of the partition wall 28. The hydraulic fluid tank 8 is disposed between the cab 6 and the air cleaner 25 in the vehicle front-back direction. Therefore, the space for disposing the air cleaner 25, the first exhaust processing device 23, and the second exhaust processing device 24 is limited by the hydraulic fluid tank 8 and the cooling device 22. However, the air cleaner 25, the first exhaust processing device 23, and the second exhaust processing device 24 can be disposed in a compact manner in the vehicle front-back direction in the work vehicle according to the exemplary embodiment. As a result, the air cleaner 25, the first exhaust processing device 23, and the second exhaust processing device 24 can be disposed between the hydraulic fluid tank 8 and the cooling device 22 while suppressing an increase in the size of the engine room 7 in the vehicle front-back direction.

The second connecting pipe 42 is disposed over the second exhaust processing device 24. The first exhaust processing device 23 and the second exhaust processing device 24 can be disposed near each other in the vehicle front-back direction. As a result, the size of the engine room 7 can be made smaller in the vehicle front-back direction.

The partitioning member 56 is disposed between the second exhaust processing device 24 and the air cleaner 25. As a result, the adverse effect of heat from the second exhaust processing device 24 onto the air cleaner 25 can be suppressed even though the second exhaust processing device 24 and the air cleaner 25 are disposed near each other.

Although an exemplary embodiment of the present invention has been described so far, the present invention is not limited to the above embodiments and various modifications may be made within the scope of the invention.

The first exhaust processing device 23 is exemplified as a DPF and the second exhaust processing device 24 is exemplified as a SCR in the above exemplary embodiment. However, exhaust processing devices other than a DPF or a SCR may be used as the first exhaust processing device 23 and the second exhaust processing device 24.

The disposition of the air cleaner 25 is not limited to the disposition of the above exemplary embodiment and may be changed. For example, the center axis of the air cleaner 25 may be disposed in a direction that intersects the vehicle width direction. The disposition of the cooling device 22 is not limited to the disposition of the above exemplary embodiment and may be changed. For example, the cooling device 22 is not limited to being disposed rearward of the engine 21 and may be disposed in another position.

The tank disposed in front of the air cleaner 25 is not limited to the hydraulic fluid tank 8 and may be another tank, such as a fuel tank. The shape of the tank is not limited to the shape of the above exemplary embodiment and may be changed. The position of the tank is not limited to the position of the above exemplary embodiment and may be changed.

According to exemplary embodiments of the present invention, a reduction in visibility to the rear is suppressed in the wheel loader in which two or more exhaust processing devices are disposed in the engine room.

The invention claimed is:

1. A wheel loader comprising:
   a cab;
   an engine room disposed rearward of the cab,
   an engine disposed inside the engine room;
   a first exhaust processing device and a second exhaust processing device disposed over the engine;
   an air cleaner disposed in the engine room in front of the first exhaust processing device and the second exhaust processing device; and
   a tank disposed between the cab and the air cleaner in a vehicle front-back direction;
   a rear surface of the tank having a lower rear surface part, an inclined surface part, and an upper rear surface part positioned above the lower rear surface part and positioned forward of the lower rear surface part, the inclined surface part of the rear surface of the tank being disposed between the lower rear surface part and the upper rear surface part in an up-down direction and inclined forward and upward; and
   at least a portion of the air cleaner being disposed facing the upper rear surface part.

2. The wheel loader according to claim 1, wherein
   at least a portion of the air cleaner overlaps the lower rear surface part as seen in a plan view.

3. The wheel loader according to claim 1, wherein
   the first exhaust processing device, the second exhaust processing device, and the air cleaner are disposed above the lower rear surface part.

4. The wheel loader according to claim 1, wherein
   at least a portion of the air cleaner overlaps the inclined surface part as seen in a plan view.

5. The wheel loader according to claim 1, wherein
   a dimension in the up-down direction of the lower rear surface part is less than a dimension in the up-down direction of the inclined surface part.

6. The wheel loader according to claim 1, wherein
   a dimension in the up-down direction of the inclined surface part is greater than a dimension in the front-back direction of the inclined surface part.

7. The wheel loader according to claim 1, wherein
   the rear surface of the tank has a bent portion positioned between the upper rear surface part and the inclined surface part, and the air cleaner is disposed facing the bent portion.

8. The wheel loader according to claim 1, wherein
   an upper surface of the tank is higher than an upper surface of the air cleaner.

9. The wheel loader according to claim 1, wherein
   the upper rear surface part is formed from a flat surface that extends in the up-down and left-right direction.

10. The wheel loader according claim 1, wherein
    at least a portion of the air cleaner overlaps the engine as seen in a top view.

11. The wheel loader according to claim 1, wherein
    an angle in the up-down direction of an inclined surface part is in a range of greater than or equal to 10 degrees and less than or equal to 20 degrees.

12. The wheel loader according to claim 1, wherein
    the first exhaust processing device is disposed so that a center axis of the first exhaust processing device extends in a vehicle width direction; and
    the second exhaust processing device is disposed in front of the first exhaust processing device and is disposed so that a center axis of the second exhaust processing device extends in the vehicle width direction.

13. The wheel loader according to claim 12, wherein
    the air cleaner is disposed so that a center axis of the air cleaner extends in the vehicle width direction.

14. The wheel loader according to claim 12, further comprising
    an exhaust pipe connected to the second exhaust processing device; and
    an intake pipe connected to the air cleaner;
    the intake pipe being disposed forward of the exhaust pipe.

15. The wheel loader according to claim 14, wherein
    the exhaust pipe is positioned over the second exhaust processing device; and
    the intake pipe is positioned over the air cleaner.

16. The wheel loader according to claim 1, further comprising
    a partition wall disposed rearward of the engine; and
    a cooling device disposed rearward of the partition wall and having a radiator and a fan.

17. The wheel loader according to claim 1, further comprising
    a connecting pipe disposed over the first exhaust processing device and/or the second exhaust processing device for connecting the first exhaust processing device and the second exhaust processing device.

18. The wheel loader according to claim 1, further comprising
    a partitioning member disposed between the second exhaust processing device and the air cleaner.

* * * * *